(12) United States Patent
Woo et al.

(10) Patent No.: US 8,935,489 B2
(45) Date of Patent: Jan. 13, 2015

(54) ADAPTIVELY TIME-MULTIPLEXING MEMORY REFERENCES FROM MULTIPLE PROCESSOR CORES

(75) Inventors: Steven C. Woo, Saratoga, CA (US); Trung A. Diep, San Jose, CA (US); Michael T. Ching, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 13/500,067

(22) PCT Filed: Nov. 10, 2010

(86) PCT No.: PCT/US2010/056195
§ 371 (c)(1),
(2), (4) Date: Apr. 3, 2012

(87) PCT Pub. No.: WO2011/090537
PCT Pub. Date: Jul. 28, 2011

(65) Prior Publication Data
US 2012/0278583 A1 Nov. 1, 2012

Related U.S. Application Data

(60) Provisional application No. 61/296,423, filed on Jan. 19, 2010.

(51) Int. Cl.
*G06F 12/00* (2006.01)
*G06F 13/16* (2006.01)
*G06F 9/52* (2006.01)

(52) U.S. Cl.
CPC .............. *G06F 13/1652* (2013.01); *G06F 9/52* (2013.01)
USPC ........................................................ 711/157

(58) Field of Classification Search
USPC .............................. 711/103, 106, 157; 712/32
See application file for complete search history.

(56) References Cited

U.S. PATENT DOCUMENTS 5,611,075 A 3/1997 Garde
5,768,629 A * 6/1998 Wise et al. ...................... 710/68
(Continued)

FOREIGN PATENT DOCUMENTS

CN 1506835 A 7/2004
WO WO-2007-132424 A2 11/2007

OTHER PUBLICATIONS

PCT Search report and the Written Opinion dated Jul. 13, 2011 re Int'l. Application No. PCT/US2010/056195. 9 Pages.
(Continued)

*Primary Examiner* — April Y Blair
*Assistant Examiner* — Trang Ta
(74) *Attorney, Agent, or Firm* — The Neudeck Law Firm, LLC

(57) ABSTRACT

The disclosed embodiments relate to a system for processing memory references received from multiple processor cores. During operation, the system monitors the memory references to determine whether memory references from different processor cores are interfering with each other as the memory references are processed by a memory system. If memory references from different processor cores are interfering with each other, the system time-multiplexes the processing of memory references between processor cores, so that a block of consecutive memory references from a given processor core is processed by the memory system before memory references from other processor cores are processed.

36 Claims, 4 Drawing Sheets

(56) References Cited

U.S. PATENT DOCUMENTS

| | | | |
|---|---|---|---|
| 6,496,909 B1* | 12/2002 | Schimmel | 711/163 |
| 6,785,793 B2* | 8/2004 | Aboulenein et al. | 711/167 |
| 7,043,599 B1* | 5/2006 | Ware et al. | 711/106 |
| 7,127,574 B2* | 10/2006 | Rotithor et al. | 711/158 |
| 7,178,005 B1* | 2/2007 | Jordan et al. | 711/217 |
| 7,197,652 B2 | 3/2007 | Keller et al. | |
| 7,240,164 B2* | 7/2007 | Hooper et al. | 711/143 |
| 7,281,110 B1 | 10/2007 | Cismas | |
| 7,424,579 B2 | 9/2008 | Wheeler et al. | |
| 8,065,459 B2* | 11/2011 | Bekooij | 710/244 |
| 2002/0059502 A1* | 5/2002 | Reimer et al. | 711/152 |
| 2004/0117510 A1 | 6/2004 | Arimilli et al. | |
| 2004/0133767 A1 | 7/2004 | Chaudhry et al. | |
| 2004/0162951 A1 | 8/2004 | Jacobson et al. | |
| 2005/0132148 A1 | 6/2005 | Arimilli et al. | |
| 2006/0026411 A1 | 2/2006 | Yoshida | |
| 2006/0112255 A1* | 5/2006 | Sprangle et al. | 711/204 |

OTHER PUBLICATIONS

Mutlu, Onur & Moscibroda, Thomas, "Parallelism-Aware Batch Scheduling: Enabling High-Performance and Fair Shared Memory Controllers", IEEE Computer Society, Jan./Feb. 2009. 11 Pages.

* cited by examiner

ADAPTIVELY TIME-MULTIPLEXING MEMORY REFERENCES FROM MULTIPLE PROCESSOR CORES

TECHNICAL FIELD

The disclosed embodiments generally relate to the design of memory systems for computers. More specifically, the disclosed embodiments relate to the design of a memory system that provides adaptive time-multiplexing for memory references received from multiple processor cores.

BACKGROUND

Recent advances in computing technology have enabled computer system designers to efficiently integrate multiple processor cores into a single chip. At present, dual-core processor systems are commonplace, and quad-core processor systems are going to dominate in the next couple of years. Extrapolating forward several years, the technology roadmap for virtually every processor manufacturer indicates significant growth in the number of processor cores in computer systems. Hence, computer systems are likely to include 64, 128, 256, or even 512 processor cores in the not-too-distant future.

However, as larger numbers of processor cores attempt to access a computer's memory system, conflicts are likely to arise. More specifically, because processor cores generally run different programs, their memory reference patterns are generally uncorrelated. This lack of correlation is not a problem for computer systems that have a small number of processor cores and a large number of memory banks, because the likelihood of two or more processor cores accessing the same memory banks is small on average when the number of banks is much larger than the number of processor cores. Hence, references from a given processor core are unlikely to encounter open pages from another processor core. The rows which are accessed by a given processor core are likely to be already open to service preceding references from the given processor core, which means that memory references are likely to generate page-hits.

However, as the number of processor cores increases, the number of software threads is likely to increase proportionately, and with more threads comes more interference. The likelihood of a thread interfering with another thread is likely to increase significantly with the number of threads for a given number of banks in the memory system. For example, instead of keeping a page open to service multiple column accesses from the same processor core to take advantage of spatial locality in reference streams, an access from another processor core can disrupt the memory access stream and cause the page to be closed and a new page to be opened. These additional page operations cause additional precharge and activate operations, and can lead to wasted power and lower efficiency for the memory system.

DETAILED DESCRIPTION

Time-Multiplexing

The disclosed embodiments provide a scalable solution which improves memory system power and performance by increasing the locality in the memory reference stream as seen by the system memory controller. During the course of execution, a program often exhibits varying amounts of spatial and temporal locality. When multiple programs are running in parallel, while each program may exhibit its own spatial and temporal locality, when their respective memory reference streams reach the memory controller, the mixing of the memory reference streams can cause spatial and temporal locality to be severely reduced. Hence, to improve overall memory reference stream locality, the memory controller can time-multiplex access to the memory system between processor cores when the overall memory reference stream exhibits a lack of locality. This time-multiplexing allows the memory controller to issue multiple memory references from one processor core back-to-back, thereby utilizing the processor core's locality to improve overall memory system power consumption and performance. This technique sometimes adds latency to references from different cores, but there is typically less latency for consecutive references from a given processor core.

Figure 1:
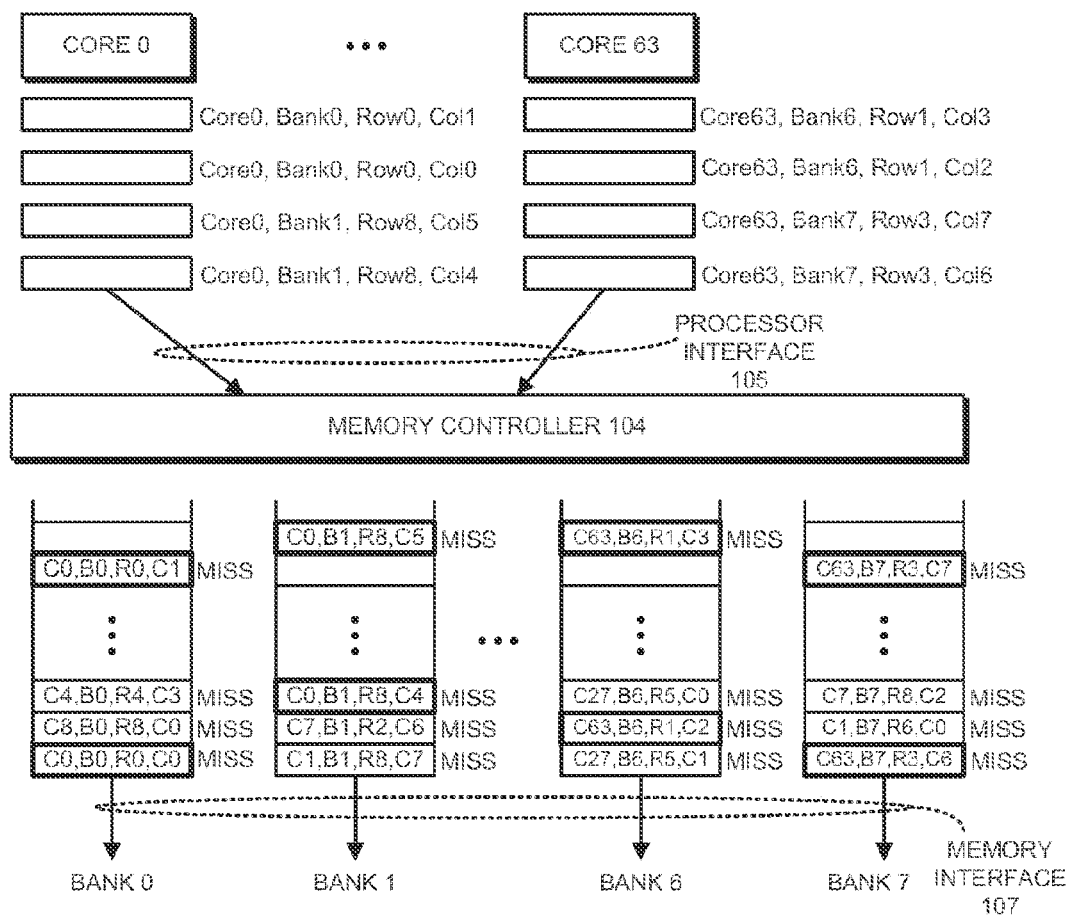
FIG. 1 illustrates an example of how memory references from multiple processor cores are processed in accordance with the disclosed embodiments.

For example, FIG. 1 illustrates a system which includes 64 processor cores (core0, . . . , core63) and memory devices that include memory banks FIG. 1 also illustrates a number of memory references in which each memory reference is associated with a specific originating core, bank, row and column. For example, the memory reference which appears immediately under core 0 is labeled "Core0, Bank0, Row0 and Col1". This memory reference also appears in the queue for bank 0 with the abbreviated label "C0, B0, R0, C1," wherein "C0" represents core 0, "B0" represents bank 0, "R0" represents row 0 and "C0" represents column 0.

In this example, the processor cores (core0, . . . , core63) send their memory references to a memory controller 104. Memory controller 104 receives these references through a processor interface 105 and forwards the memory references to respective queues for the eight memory banks (bank0, . . . , bank7) and then to the eight memory banks through a memory interface 107. In one embodiment, the memory controller and processor cores are all implemented as functional circuit blocks on a single chip or integrated circuit device. The memory devices, for example dynamic random access memory devices, can be single chip devices that include memory cells organized as banks. Alternatively the memory banks can be integrated on a single chip along with the processor cores and the memory controller. In another embodiment, the processor cores, memory controller and memory devices are implemented on separate chips. Separate chip implementations can be housed or packaged in a stacked configuration, for example by using through silicon vias, and can be encapsulated in a single package housing. Because there are 64 processor cores and eight memory banks, memory references from different processor cores are likely to interfere with each other at the memory banks. The stream of references from core) accesses bank0 and bank1, while the stream of references from core63 accesses bank6 and bank7. However, in this example, because there exist a large number of intervening memory references from other processor cores, each memory access encounters an open page associated with another processor core, which causes a page-miss.

Figure 2:
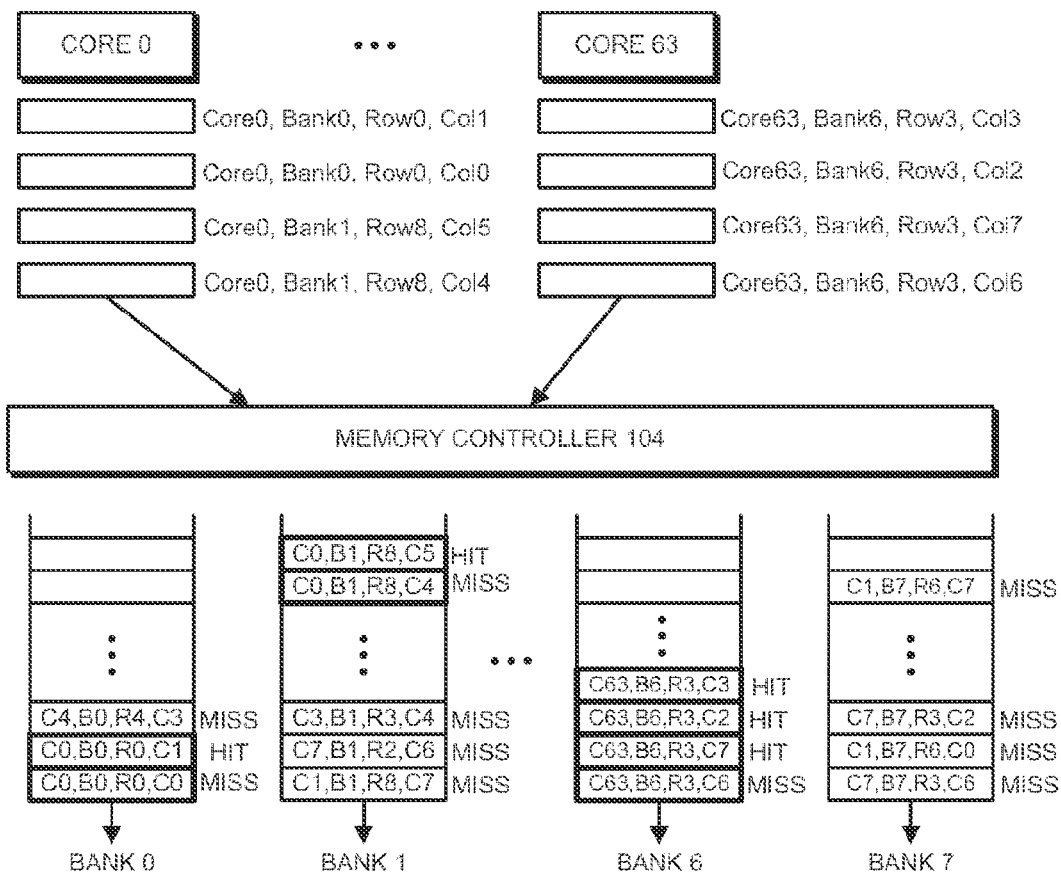
FIG. 2 illustrates another example of how memory references from multiple processor cores are processed in accordance with the disclosed embodiments.

FIG. 2 illustrates another example in which time-multiplexing has been activated in a system such as the one illustrated in FIG. 1. The system in FIG. 2 also includes 64 processor cores (core0, . . . , core63) and eight memory banks (bank0, . . . , bank7). When time-multiplexing is activated, each processor core is able to issue a block of memory references consecutively. These blocks of consecutive memory references typically have some amount of locality, so these accesses tend to generate more page-hits. In particular, the first access to page may generate a page-miss, but subsequent accesses to the same page by the same processor core will generate page-hits. This increased hit rate reduces the number of precharge and activate operations, which saves power and can possibly increase performance.

To optimize the performance of this technique, it is important to be able to determine when to start and end the time-multiplexing. To accomplish this, the system can augment each memory request sent from a processor core to the memory controller with a hint (on the order of a couple of additional bits) that indicates whether the transaction would have been a hit, a miss, or an empty-access had the initiating core been the only requestor in the computer system. These hints can be generated by maintaining a storage structure in each processor and/or processor core that tracks the state of the accessed pages as if the processor core were the only processor core in the system. (Note that this structure is different from, and in addition to, a similar structure located in the memory controller.)

Next, the memory controller compares these hints against the actual transactional results to determine if hits and empty-accesses are being turned into misses because of interference from memory references from other processor cores. If too many hits and empty-accesses at the individual processors/cores/threads are being turned into misses, the memory controller can switch to time-multiplexing. It is important to note that, even though in some situations these hints may adversely affect performance, they do not affect correctness.

Also, instead of generating the hints at the processor cores, the queues and other circuitry involved in generating the hints can alternatively be incorporated into the memory controller. However, this can lead to a prohibitively large and complex memory controller that does not scale well with the number of processor cores, and which can become a bottleneck to performance. The hints attached to the memory references can also include a suggestion about whether or not to precharge the page after a memory reference completes.

Processor cores can be notified to switch into time-multiplexing mode via a number of possible communication mechanisms, such as tokens or direct messages from the memory controller. For example, in a token-based system, possession of a token by a processor core indicates that it is the processor core's turn to issue memory references. If the processor core does not have any references to issue, the processor core can pass the token to another processor core. Tokens can be communicated efficiently through a simple processor-core interconnection topology, such as a ring.

Tokens can also communicate different types of information between the memory controller and the cores. Examples include when to turn multiplexing on and off, when to time-multiplex a subset of banks (and not the entire memory system), and when to enforce time-multiplexing for a subset of cores. Decisions on when to turn on multiplexing, which banks to time multiplex, etc. can be made based on hints such as those described above, or based on additional information, such as the depth of occupancy of the memory bank queues at the memory controller. Note that these tokens provide a framework in which information about the memory controller can be used by the processor cores and vice versa. Conventionally, memory systems have provided only one-way communication from the processor cores to the memory controller, with no communication coming back the other way.

Tokens and memory references can also be used to communicate priority information. For example specific threads and associated memory references can be identified as being "high-priority" to ensure a high Quality of Service (QoS). For example, high-priority references can be allowed to issue without stalling, and a high-priority thread can be allowed to issue a larger block of consecutive references than a lower-priority thread.

Moreover, the tokens or messages passed to the processor cores can also include information specifying the number of consecutive references that can be issued by a core. In this way, the number of consecutive memory references that each processor core can issue to the memory controller can be increased or decreased (within user-defined limits) depending upon how well the processed memory references match the hints from the processor cores. When a small number of hits/empty-accesses are being turned into misses, or if average latency is being negatively impacted by time-multiplexing, the degree of time-multiplexing can be reduced (fewer consecutive references per core), or time-multiplexing can be terminated.

Ring Topology

Figure 3:
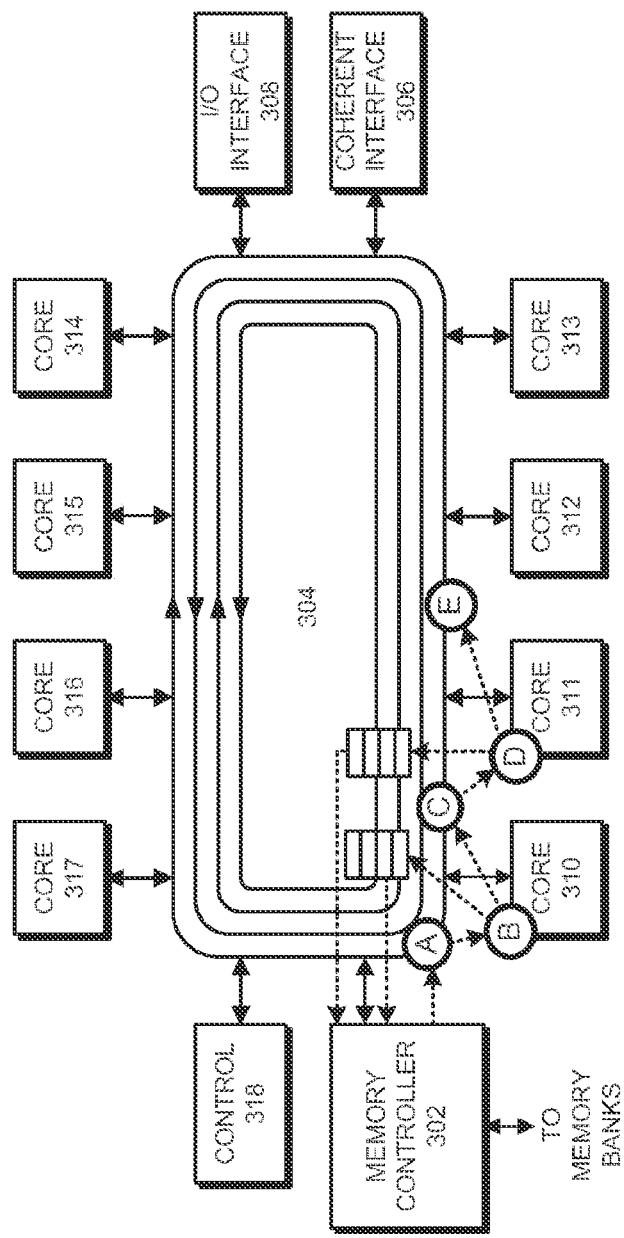
FIG. 3 illustrates how processor cores can be coupled into a ring topology in accordance with the disclosed embodiments.

FIG. 3 illustrates an exemplary ring topology for a multi-core processor system in accordance with the disclosed embodiments. (Note that a ring topology is only one of a number of possible interconnect topologies. In general, other interconnection topologies can also be used.) This ring topology includes a number of processor cores 310-317 which are coupled to a bidirectional ring 304. The system also includes a control processor 318 which is coupled to ring 304, wherein control processor 318 facilitates executing an operating system and various applications and also controls operation of processor cores 310-317. Ring 304 is also coupled to an I/O interface 308 to provide access to I/O devices, such as disk drives. Ring 304 is additionally coupled to a coherent interface 306, which facilitates controlling coherence among caches in the processor cores 310-317, control processor 318 and additional processor cores on a different die (not shown) that are connected through the coherent interface 306. Finally, ring 304 is also coupled to a memory controller 302, which directs memory requests from processor cores 310-317 and control processor 318 to a number of memory banks (not shown).

During operation of the computer system illustrated in FIG. 3, when the computer system is heavily loaded and memory accesses from different processor cores begin to interfere with each other, memory controller 302 initiates time-multiplexing by passing a token onto ring 304 (label A). This token first flows to processor core 310, which in response to receiving the token issues a block of consecutive memory references to memory controller 302 (label B). After processor core 310 has issued the block of consecutive memory references, it passes the token back onto the ring (label C). Next, the token flows to processor core 311, which also issues a block of consecutive memory references to memory controller 302 (label D). After processor core 311 has issued its block of consecutive memory references, it passes the token back onto the ring (label E) for the next core, and so on. The token continues to circulate around the ring to control the issuing of memory reference until memory controller 302 terminates the time-multiplexing by removing the token from the ring.

Scheduling Decisions Made by Processor Cores

The processor cores can also make certain scheduling decisions to optimize performance during time-multiplexing. For example, a given processor core can track the last open pages in each bank for its own reference stream. This enables the given processor core to determine which memory references will generate page-hits during time-multiplexing. The processor cores can also maintain their own local queues that store pending references to each memory bank. The processor cores can then search and sort the memory references in these local queues before consolidating a set of memory references to be sent to the memory controller. This additional queue space at the processor cores effectively acts like a per-bank overflow storage area that extends the list of pending references per memory bank beyond what the memory controller can store.

The preceding examples presume that all storage and scheduling decisions are made by the processor cores and the memory controller. However, a ring bus architecture often includes ring "stops" (places to enter and exit rings, as well as transfer between rings or skip ring stops), and the above-described techniques can be applied to ring stops as well. For example, memory references can be buffered in the ring stops, and tokens can be used to control access restrictions for the ring stops and/or their associated processor cores. Scheduling decisions can also be made by the ring stops in addition to (or instead of) by the cores and/or memory controller.

Latency Sensitive Requests

The above embodiments, in some aspects, relate to situations in which the memory system is heavily loaded and power consumption and bandwidth are important. However, there are other embodiments in which the above-described techniques can be applied, for example when the memory system is less loaded and reducing latency is a more important consideration. In this case, memory references can be augmented to include a timestamp specifying when they were generated. If time-multiplexing is enabled and references can't be issued until the processor core gains possession of a token, when a memory reference is finally issued to the memory controller, the associated timestamp is examined to determine how long the reference has been delayed. If the delay is large relative to the time the memory reference spends in the memory bank queues and the memory controller, the time-multiplexing is detrimental to memory latency and it should be turned off for this bank/core. Also, if average latency becomes too high (and queues are not full), the memory controller can issue a second token to effectively cut the wait time in half.

Processing Memory References

Figure 4:
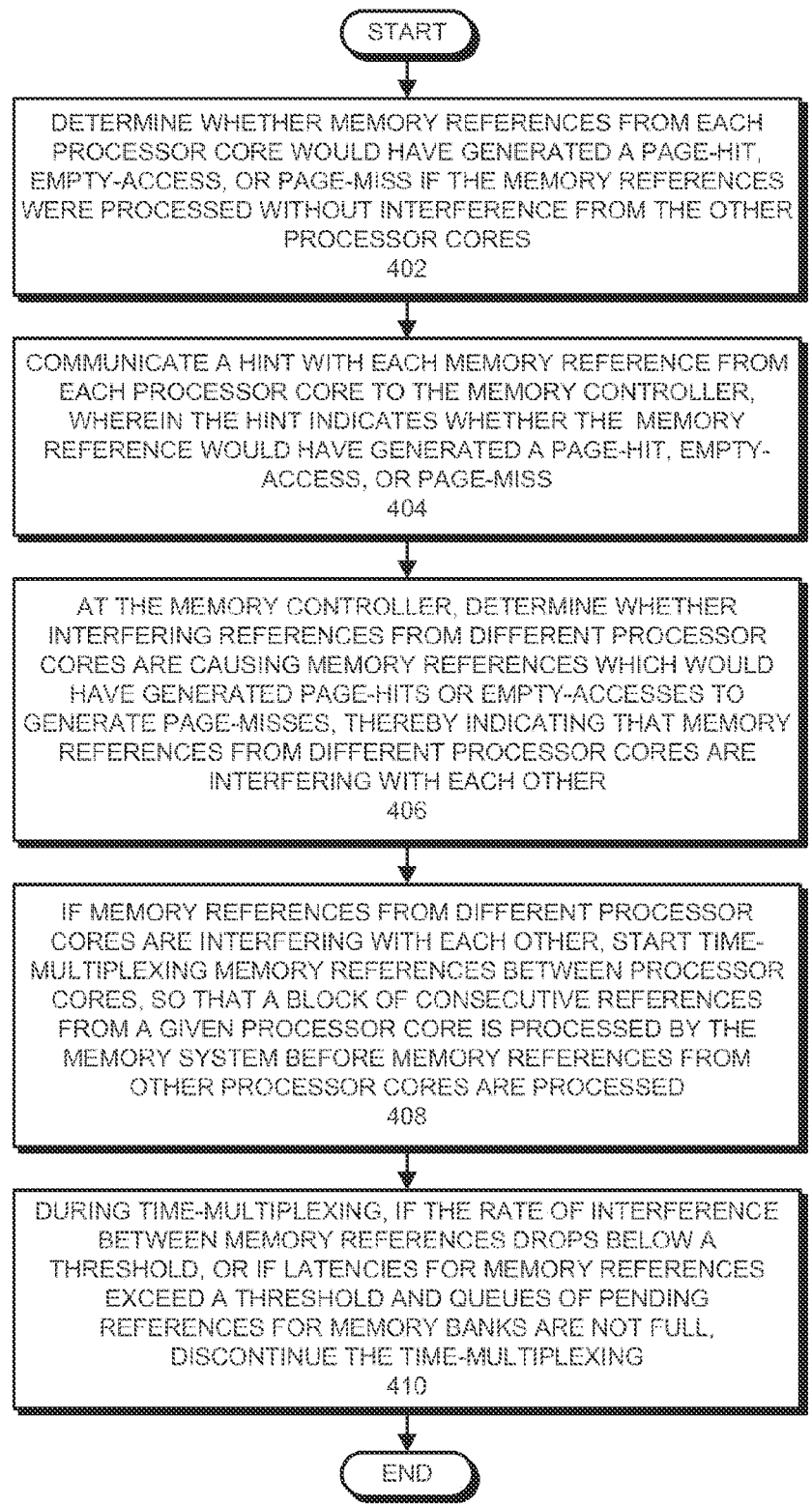
FIG. 4 presents a flow chart illustrating how memory references are processed in accordance with the disclosed embodiments.

FIG. 4 presents a flow chart illustrating how memory references are processed in accordance with the disclosed embodiments. First, each processor core determines whether memory references from the processor core would have generated a page-hit, an empty-access, or a page-miss if all memory references from the processor core were processed without interference from other processor cores (step 402). Next, each processor core communicates a hint with each memory reference to the memory controller, wherein the hint indicates whether the memory reference would have generated a page-hit, an empty-access, or a page-miss (step 404).

Next, the memory controller uses the hints to determine whether memory references from other processor cores are causing memory references from the given processor core, which would have generated page-hits or empty-accesses, to generate page-misses, thereby indicating that memory references from different processor cores are interfering with each other (step 406). If memory references from different processor cores are interfering with each other, the memory controller starts time-multiplexing the processing of memory references between processor cores, so that a block of consecutive memory references from a given processor core is processed by the memory system before memory references from other processor cores are processed (step 408). (Note that it is also possible for the processor cores to initiate the time-multiplexing if some type of feedback mechanism is provided to enable the processor cores to learn whether the references turned out to be hits or misses. The processor cores can then compare this information with the hints they generated for the references.)

Finally, while time-multiplexing is taking place, if the rate of interference between memory references from different processor cores falls below a threshold, or if latencies for the memory references exceed a threshold and if queues containing pending references for the memory banks are not full, the memory controller can either discontinue the time-multiplexing (step 410), or reduce the degree of time-multiplexing by reducing the number of consecutive memory references a core can issue at one time.

Generalizations and Extensions

The above-described techniques relate to time-multiplexing, but they can be extended to the more general concept of controlling how and when changes are made to the mechanism by which memory references are passed from processor cores to the memory controller. Moreover, although the above-described techniques are described in the context of a computer system which includes only one memory controller, these techniques can also be applied to computer systems that have multiple memory controllers.

Also, the storage and scheduling decisions described above in the context of ring bus architectures can be extended to alternative interconnection topologies, such as a mesh or cross-connected configuration.

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Moreover, the methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware. For example, the hardware can include, but is not limited to, application-specific integrated circuit (ASIC) chips, field-programmable gate arrays (FPGAs), system-on-chip integrated circuits and other programmable-logic devices now known or later developed. When the hardware is activated, the hardware performs the methods and processes included within the hardware modules.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for processing memory references in a system which includes multiple processor cores, the method comprising:
   receiving a first plurality of memory references from a first processor core;
   receiving, interleaved with said first plurality of memory references, a second plurality of memory references from at least a second processor core, each of said first plurality of memory references and said second plurality of memory references causing, in a given memory bank, a selected one of a page-hit, an empty access, and a page-miss, said page-hit being a memory access to an open page of a memory bank, said empty-access being a memory access to a memory bank with no open page, and said page-miss being a memory access to a closed page of a memory bank that has another page that is open;
   determining whether said first plurality of memory references would have caused fewer page-misses if the second plurality of memory references were not interleaved with the first plurality of memory references; and
   in response to determining that said first plurality of memory references would have caused fewer page-misses if the second plurality of memory references were not interleaved with the first plurality of memory references, time-multiplexing the processing of a third plurality of memory references received from the first processor core such that a first block of at least two consecutive memory references of the third plurality of memory references are processed without being interleaved with other memory references received from said at least second processor core.

2. The method of claim 1, further comprising:
   during the time-multiplexing of the processing of the third plurality of memory references, determining if a rate of interference between at least said first processor core and said at least second processor core falls below a threshold;
   in response to the rate of interference between the at least said first processor core and said at least second processor core falling below the threshold, discontinuing the time-multiplexing of the processing of the third plurality of memory references such that a second block of at least two consecutive memory references of the third plurality of memory references is processed interleaved with other memory references received from said at least second processor core.

3. The method of claim 1, further comprising:
   monitoring the third plurality of memory references by measuring a latency for each of the third plurality of memory references; and
   during the time-multiplexing of the processing of the third plurality of memory references, if latencies for the third plurality of memory references exceed a threshold, and if queues containing pending references for corresponding memory banks are not full, reducing a number of memory references in a second block of at least two consecutive memory references.

4. The method of claim 1, wherein determining whether said first plurality of memory references would have caused fewer page-misses if the second plurality of memory references were not interleaved with the first plurality of memory references further includes:
   determining, at a given processor core of the multiple processor cores, and for each memory reference from the given processor core, which one of said page-hit, said empty-access, and said page-miss each memory reference from the given processor core would have caused if each memory reference from the given processor core were processed without being interleaved with memory references from other processor cores;
   communicating a hint indicator along with each memory reference from the given processor core to a memory controller, wherein the hint indicator communicated along with each memory reference indicates, for that memory reference, whether the memory reference would have caused said page-miss; and
   at the memory controller, using a plurality of hint indicators to determine whether memory references from other processor cores are causing memory references from the given processor core, that otherwise would not have caused page-misses, to cause page-misses, thereby indicating that memory references from said other processor cores are interfering with memory references from said given processor core.

5. The method of claim 1, wherein the multiple processor cores are coupled together in a ring topology, wherein the time-multiplexing includes passing a token on the ring between the multiple processor cores, and wherein the token allows a one of the multiple processor cores to issue a second block of at least two consecutive memory references.

6. The method of claim 5, wherein the time-multiplexing further includes circulating multiple tokens on the ring.

7. The method of claim 5, wherein memory references are directed to a plurality of banks of a memory system, and wherein the time-multiplexing is applied to memory references which are directed to a specific subset of the plurality of banks in the memory system, and time-multiplexing is not applied to memory references which are not directed to the specific subset of the plurality of banks.

8. The method of claim 5, wherein the time-multiplexing is applied to memory references which originate from a specific subset of processor cores in the system, and is not applied to memory references which do not originate from the specific subset of processor cores.

9. The method of claim 5, wherein the token skips specific processor cores on the ring based on one or more conditions.

10. The method of claim 5, wherein the token specifies a size of a block of at least two consecutive memory references that a selected processor core of the multiple processor cores issues without interference from other processor cores during the time-multiplexing.

11. The method of claim 5, wherein time-multiplexing includes preventing one or more processor cores of multiple processor cores from issuing memory references for a period of time.

12. The method of claim 5, wherein the time-multiplexing includes allowing predetermined memory references to proceed without waiting for other memory references.

13. The method of claim 5, wherein the time-multiplexing includes allowing a predetermined thread to issue a second block of at least two consecutive memory references which is larger than a third block of at least two consecutive memory references that a lower-priority thread issues.

14. The method of claim 1, wherein a given processor core of the multiple processor cores keeps track of pending memory references; and
wherein while time-multiplexing is taking place, the given processor core reorders the pending memory references to maximize page-hits and empty-accesses when the processor core issues a second block of at least two consecutive memory references.

15. A method comprising:
receiving a first plurality of memory references from a first thread running on a first processor core;
receiving, interleaved with said first plurality of memory references, a second plurality of memory references from at least a second thread running on at least a second processor core, each of said first plurality of memory references and said second plurality of memory references causing, in a given memory bank, a selected one of a page-hit, an empty access, and a page-miss, said page-hit being a memory access to an open page of a memory bank, an empty-access being a memory access to a memory bank with no open page, and a page-miss being a memory access to a closed page of a memory bank that has another page that is open;
determining whether said first plurality of memory references would have caused fewer page-misses if the second plurality of memory references were not interleaved with the first plurality of memory references; and
in response to determining that said first plurality of memory references would have caused fewer page-misses if the second plurality of memory references were not interleaved with the first plurality of memory references, time-multiplexing the processing of a third plurality of memory references received from the first thread, such that a first block of at least two consecutive memory references of the third plurality of memory references received from the first thread is processed without being interleaved with memory references received from said at least second thread.

16. An integrated circuit comprising:
multiple processor cores that issue a first plurality of memory references from a first set of said multiple processor cores and a second plurality of memory references from a second set of said multiple processor cores, each of said first plurality of memory references and said second plurality of memory references causing, in a given memory bank, a selected one of a page-hit, an empty access, and a page-miss, said page-hit being a memory access to an open page of a memory bank, said empty-access being a memory access to a memory bank with no open page, and said page-miss being a memory access to a closed page of a memory bank that has another page that is open; and
a memory controller to determine whether said second plurality of memory references would have caused fewer page-misses if the second plurality of memory references were not interleaved with the first plurality of memory references; and
wherein in response to determining that said second plurality of memory references would have caused fewer page-misses if the second plurality of memory references were not interleaved with the first plurality of memory references, the memory controller is configured to time-multiplex the processing of a third plurality of memory references between processor cores, so that blocks of at least two consecutive memory references of the third plurality of memory references from a given processor core of the multiple processor cores are processed by the memory controller without being interleaved with memory references of the third plurality of memory references from other processor cores of the multiple processor cores.

17. The integrated circuit of claim 16, wherein when the time-multiplexing is taking place, if a rate of interference between memory references of the third plurality of memory references from different processor cores of the multiple processor cores falls below a threshold, the memory controller is configured to reduce a number of memory references in said blocks of at least two consecutive memory references issued by said given processor core.

18. The integrated circuit of claim 16, wherein the memory controller is configured to measure a latency for each memory reference of the third plurality of memory references; and
wherein while time-multiplexing is taking place, if latencies for the memory references of the third plurality of memory references exceed a threshold, and if queues containing pending references for corresponding memory banks are not full, the memory controller is configured to reduce a number of memory references in the blocks of at least two consecutive memory references issued by said given processor core.

19. The integrated circuit of claim 16, wherein said second set of said multiple processor cores are configured to determine for each of the second plurality of memory references which one of said page-hit, said empty-access, and said page-miss each of the second plurality of memory references would have caused if the second plurality of memory references were processed without being interleaved with the first plurality of memory references;
wherein the second set of processor cores are configured to communicate a hint indicator along with each of the second plurality of memory references to the memory controller, wherein the hint indicator communicated along with each of the second plurality memory references indicates whether a respective memory reference would have caused one of said page-hit, said empty-access, and said page-miss; and
wherein the memory controller is configured to use a plurality of hint indicators associated with the second plurality of memory references to determine whether memory references from the first set of processor cores are causing memory references from the second set of processor cores, which would otherwise have caused either page-hits or empty-accesses, to cause page-misses, thereby indicating that memory references from said first set of processor cores are interfering with the second plurality of memory references.

20. The integrated circuit of claim 16, wherein the multiple processor cores in the integrated circuit are coupled together in a ring topology, wherein the time-multiplexing is implemented by passing one or more tokens between the multiple processor cores on the ring, and wherein a token allows a processor core to issue a block of at least two consecutive memory references.

21. The integrated circuit of claim 20, wherein the time-multiplexing comprises circulating multiple tokens on the ring.

22. The integrated circuit of claim 20, wherein the time-multiplexing is applied to memory references of the third plurality of memory references which are directed to a specific set of banks controlled by the memory controller, and is not applied to memory references of the third plurality of memory references which are not directed to the specific set of banks.

23. The integrated circuit of claim 20, wherein the time-multiplexing is applied to memory references of the third plurality of memory references which originate from a specific subset of processor cores in the integrated circuit, and is not applied to memory references of the third plurality of memory references which do not originate from the specific subset of processor cores.

24. The integrated circuit of claim 20, wherein a given token skips specific processor cores on the ring based on one or more conditions.

25. The integrated circuit of claim 20, wherein each token specifies a size of the blocks of at least two consecutive memory references that each processor core of the multiple processor cores can issue without having said at least two consecutive memory references interleaved with memory references from other processor cores of the multiple processor cores during time-multiplexing.

26. The integrated circuit of claim 20, wherein the time-multiplexing includes preventing one or more processor cores from issuing memory references for a period of time.

27. The integrated circuit of claim 20, wherein the time-multiplexing includes allowing specific high-priority memory references of the third plurality of memory references to proceed without waiting for other memory references of the third plurality of memory references.

28. The integrated circuit of claim 20, wherein the time-multiplexing includes allowing a higher-priority thread to issue a first block of at least two consecutive memory references which is larger than a second block of at least two consecutive memory references which is issued by a lower-priority thread.

29. The integrated circuit of claim 20, wherein the multiple processor cores are coupled to the ring through ring stops, and wherein the time-multiplexing is performed within the ring stops.

30. The integrated circuit of claim 16, wherein said second set of said multiple processor cores are configured to keep track of pending memory references; and
    wherein while time-multiplexing is taking place, a respective one of said second set of said multiple processor cores is configured to reorder the pending memory references to maximize page-hits and empty-accesses when the respective one of said second set of said multiple processor cores issues a block of at least two consecutive memory references.

31. A memory controller, comprising:
    a processor interface configured to be coupled to multiple processor cores;
    a memory interface configured to be coupled to multiple memory devices; and
    control circuitry to receive memory references from the multiple processor cores and to issue the memory references to the multiple memory devices, the multiple memory devices comprising a plurality of memory banks, the memory references including a first plurality of memory references from a first set of said multiple processor cores and a second plurality of memory references from a second set of said multiple processor cores, each of said first plurality of memory references and said second plurality of memory references causing, in a given memory bank of said plurality of memory banks, a selected one of a page-hit, an empty access, and a page-miss, said page-hit being a memory access to an open page of a memory bank, said empty-access being a memory access to a memory bank with no open page, and said page-miss being a memory access to a closed page of a memory bank that has another page that is open;
    wherein the control circuitry is configured to monitor said memory references to determine whether said second plurality of memory references would have caused fewer page-misses if the second plurality of memory references were not interleaved with the first plurality of memory references; and
    wherein in response to determining that said second plurality of memory references would have caused fewer page-misses if the second plurality of memory references were not interleaved with the first plurality of memory references, the control circuitry is configured to time-multiplex the processing of a third plurality of memory references between processor cores, so that blocks of at least two consecutive memory references of the third plurality of memory reference from a given processor core are processed by the memory controller without being interleaved with memory references of said third plurality of memory references from other processor cores.

32. The memory controller of claim 31, wherein while determining whether said second plurality of memory references would have caused fewer page-misses if the second plurality of memory references were not interleaved with the first plurality of memory references, the memory controller is configured to determine whether the memory references from different processor cores are being interleaved to a same bank of the plurality of memory banks, thereby causing additional page-misses that lead to additional precharge and activate operations than would have occurred if said memory references from different processor cores were not being interleaved.

33. The memory controller of claim 31, wherein while the time-multiplexing is taking place, if a rate of interference between the memory references from different processor cores falls below a threshold, the memory controller is configured to discontinue the time-multiplexing.

34. The memory controller of claim 31, wherein while monitoring the memory references, the memory controller is configured to measure a latency for each memory reference of the third plurality of memory references; and
    wherein while time-multiplexing is taking place, if latencies for the memory references of the third plurality of memory references exceed a threshold, and if queues containing pending references for the plurality of memory banks are not full, the memory controller is configured to reduce a number of memory references in the blocks of at least two consecutive memory references issued by said given processor core.

35. The memory controller of claim 31, wherein the memory controller is configured to receive a hint along with each of said second plurality of memory references, wherein the hint indicates, for a respective memory reference of said second plurality of memory references, whether the respective memory reference of said second plurality of memory references would have caused a selected one of said page-hit, said empty-access, or said page-miss if said respective memory reference of said second plurality of memory references were processed without being interleaved with the first plurality of memory references; and
    wherein the memory controller is configured to use a plurality of hints associated with the second plurality of memory references to determine whether the memory references from other processor cores are causing the memory references from the second set of processor cores, which otherwise would have caused page-hits or empty-accesses, to cause page-misses, thereby indicating that memory references from different processor cores are interfering with each other.

36. The memory controller of claim 31, wherein the multiple processor cores are coupled together in a ring topology, wherein the memory controller is configured to facilitate the time-multiplexing by forwarding one or more tokens onto the ring, so the one or more tokens can circulate between the multiple processor cores on the ring, and wherein a token allows said given processor core to issue a block of at least two consecutive memory references.

* * * * *